United States Patent
Liu et al.

(10) Patent No.: US 12,436,798 B2
(45) Date of Patent: Oct. 7, 2025

(54) METHOD, ELECTRONIC DEVICE, AND COMPUTER PROGRAM PRODUCT FOR DISTRIBUTED DATA PROCESSING

(71) Applicant: Dell Products L.P., Round Rock, TX (US)

(72) Inventors: Jinpeng Liu, Shanghai (CN); Zijia Wang, WeiFang (CN); Zhen Jia, Shanghai (CN); Jiacheng Ni, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 643 days.

(21) Appl. No.: 17/884,118

(22) Filed: Aug. 9, 2022

(65) Prior Publication Data
US 2024/0028384 A1    Jan. 25, 2024

(30) Foreign Application Priority Data
Jul. 22, 2022   (CN) .......................... 202210873507.2

(51) Int. Cl.
*G06F 9/44*    (2018.01)
*G06F 9/48*    (2006.01)
*G06N 20/00*   (2019.01)

(52) U.S. Cl.
CPC ............. *G06F 9/48* (2013.01); *G06N 20/00* (2019.01)

(58) Field of Classification Search
CPC ...................................................... G06F 9/48
USPC ........................................................ 718/106
See application file for complete search history.

(56) References Cited

U.S. PATENT DOCUMENTS

2023/0135659 A1* 5/2023 Wu .................. G06N 3/044
                                                  706/21

OTHER PUBLICATIONS

A. Vaswani et al., "Attention Is All You Need," arXiv:1706.03762v5, Dec. 6, 2017, 15 pages.
T. F. Chan et al., "Updating Formulae and a Pairwise Algorithm for Computing Sample Variances," Department of Computer Science, Stanford University, Nov. 1979, 22 pages.
Nvidia Collective Communications Library, "Overview of NCCL," https://docs.nvidia.com/deeplearning/nccl/user-guide/docs/overview.html, Accessed Jul. 13, 2022, 2 pages.

(Continued)

*Primary Examiner* — Timothy A Mudrick
(74) *Attorney, Agent, or Firm* — Ryan, Mason & Lewis, LLP (57) ABSTRACT

Embodiments of the present disclosure provide a method, an electronic device, and a computer program product for distributed data processing. A method in one embodiment comprises obtaining an input for a data processing task based on a multi-head attention mechanism, the data processing task comprising a first subtask and a second subtask, the first subtask corresponding to a first attention head in the multi-head attention mechanism, and the second subtask corresponding to a second attention head in the multi-head attention mechanism. The method further comprises transmitting the input to a first dedicated computing resource and a second dedicated computing resource, the first dedicated computing resource corresponding to the first subtask, and the second dedicated computing resource corresponding to the second subtask, and performing the first subtask and the second subtask on the input for obtaining an output of the data processing task.

20 Claims, 5 Drawing Sheets

(56) References Cited

OTHER PUBLICATIONS

R. Majumder et al., "ZeRO & DeepSpeed: New System Optimizations Enable Training Models with Over 100 Billion Parameters," https://www.microsoft.com/en-us/research/blog/zero-deepspeed-new-system-optimizations-enable-training-models-with-over-100-billion-parameters/, Feb. 13, 2020, 5 pages.

L. Weng, "How to Train Really Large Models on Many GPUs?" https://lilianweng.github.io/posts/2021-09-25-train-large/, Mar. 13, 2022, 16 pages.

L. Weng, "The Transformer Family," https://lilianweng.github.io/posts/2020-04-07-the-transformer-family/, Apr. 7, 2020, 18 pages.

R. Lakshmanamoorthy, "A Complete Learning Path To Transformers (With Guide To 23 Architectures)" https://analyticsindiamag.com/a-complete-learning-path-to-transformers/, May 31, 2021, 19 pages.

D. Coccomini, "On Transformers, TimeSformers, and Attention," https://towardsdatascience.com/transformers-an-exciting-revolution-from-text-to-videos-dc70a15e617b, Mar. 31, 2021, 20 pages.

S. Chakraborty, "Practical Uses of BERT," https://sayanchak.medium.com/practical-uses-of-bert-c384ae3a5c2a, Jan. 4, 2020, 4 pages.

J. Devlin et al., "BERT: Pre-training of Deep Bidirectional Transformers for Language Understanding," arXiv:1810.04805v2, May 24, 2019, 16 pages.

J. Devlin et al., "BERT," https://github.com/google-research/bert, Mar. 11, 2020, 18 pages.

\* cited by examiner

METHOD, ELECTRONIC DEVICE, AND COMPUTER PROGRAM PRODUCT FOR DISTRIBUTED DATA PROCESSING

RELATED APPLICATION(S)

The present application claims priority to Chinese Patent Application No. 202210873507.2, filed Jul. 22, 2022, and entitled "Method, Electronic Device, and Computer Program Product for Distributed Data Processing," which is incorporated by reference herein in its entirety.

FIELD

Embodiments of the present disclosure relate to the technical field of computers, and more particularly, to a method, an electronic device, and a computer program product for distributed data processing.

BACKGROUND

A transformer model in machine learning is a deep neural network model mainly based on a self-attention mechanism, which was originally applied in the context of natural language processing (NLP). The transformer model has a strong representation ability, and therefore, the transformer model has also been greatly developed in the field of computer vision in recent years. Existing sequence processing models, such as the bidirectional encoder representations from transformers (BERT) model and the generative pre-trained transformer (GPT) model are mainly based on the transformer model. These sequence processing models require large computing devices. For example, the BERT model for NLP is typically trained using complex computing devices, such as a 64G graphics processing unit (GPU) or tensor processing unit (TPU), and therefore, the cost of processing these sequence processing models is high.

SUMMARY

Illustrative embodiments of the present disclosure provide a solution for distributed data processing.

In a first aspect of the present disclosure, a method for distributed data processing is provided. The method includes: obtaining an input for a data processing task based on a multi-head attention mechanism, the data processing task comprising a first subtask and a second subtask, the first subtask corresponding to a first attention head in the multi-head attention mechanism, and the second subtask corresponding to a second attention head in the multi-head attention mechanism; transmitting the input to a first dedicated computing resource and a second dedicated computing resource, the first dedicated computing resource corresponding to the first subtask, and the second dedicated computing resource corresponding to the second subtask; and performing the first subtask and the second subtask on the input for obtaining an output of the data processing task. In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to perform operations. The operations include: obtaining an input for a data processing task based on a multi-head attention mechanism, the data processing task comprising a first subtask and a second subtask, the first subtask corresponding to a first attention head in the multi-head attention mechanism, and the second subtask corresponding to a second attention head in the multi-head attention mechanism; transmitting the input to a first dedicated computing resource and a second dedicated computing resource, the first dedicated computing resource corresponding to the first subtask, and the second dedicated computing resource corresponding to the second subtask; and performing the first subtask and the second subtask on the input for obtaining an output of the data processing task.

In a third aspect of the present disclosure, a computer program product is provided. The computer program product is tangibly stored on a non-transitory computer-readable medium and includes computer-executable instructions, wherein the computer-executable instructions, when executed, cause a device to perform the following: obtaining an input for a data processing task based on a multi-head attention mechanism, the data processing task comprising a first subtask and a second subtask, the first subtask corresponding to a first attention head in the multi-head attention mechanism, and the second subtask corresponding to a second attention head in the multi-head attention mechanism; transmitting the input to a first dedicated computing resource and a second dedicated computing resource, the first dedicated computing resource corresponding to the first subtask, and the second dedicated computing resource corresponding to the second subtask; and performing the first subtask and the second subtask on the input for obtaining an output of the data processing task.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as "learning model," "learning network," "network model," or "model." A "neural network" or "neural network model" is a deep learning model. In general, a machine learning model is capable of receiving input data, performing predictions based on the input data, and outputting prediction results.

Generally, a machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of that processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning may generally be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model can be used to process, based on the set of parameter values obtained from the training, actual input data to provide corresponding outputs.

In order to solve the problem that a large computing device is required to train a sequence processing model, a solution for training a sequence processing model on a plurality of dedicated computing resources is proposed at present. However, the solution existing at present needs to modify infrastructures (e.g., networks, platforms, cloud configurations, and CUDA libraries), deep learning frameworks (e.g., TensorFlow and PyTorch), and deep learning programs of end-users. To solve the problem of training a sequence processing model in a plurality of dedicated computing resources (or to avoid the monopoly of a dedicated computing resource supplier), a Zero Redundancy Optimizer (ZeRO) solution is provided. The ZeRO solution runs on a plurality of dedicated computing resources, and based on a scheduling algorithm thereof, when a data processing task of a local dedicated computing resource needs to obtain parameters from a data processing task of another dedicated computing resource, the parameters need to be moved between the dedicated computing resources. Such a scheduling algorithm is very complex, and when specific operations need to be implemented in different algorithm frameworks, the solution is difficult to be integrated into different algorithm frameworks. Furthermore, the result obtained in this solution may not be optimal. The movement of parameters between a plurality of dedicated computing resources reduces the model processing efficiency. In addition, compatibility issues of parameters with operations in different dedicated computing resources lead to training divergence and prolong the training process.

To sum up, it is very difficult to train a large model in a plurality of dedicated computing resources, and it is inconvenient for an end-user side to implement such a training process.

In order to at least solve the above problems, an improved solution for distributed data processing is provided in example embodiments of the present disclosure. The solution distributes various subtasks based on a single-head attention mechanism in a data processing task based on a multi-head attention mechanism to different dedicated computing resources for performing operations. In this way, not only can the problem of the difficulty in training a large model be solved, but also an end-user can implement the training of a large model through the solution of the present disclosure even without knowing the model architecture.

Figure 1:
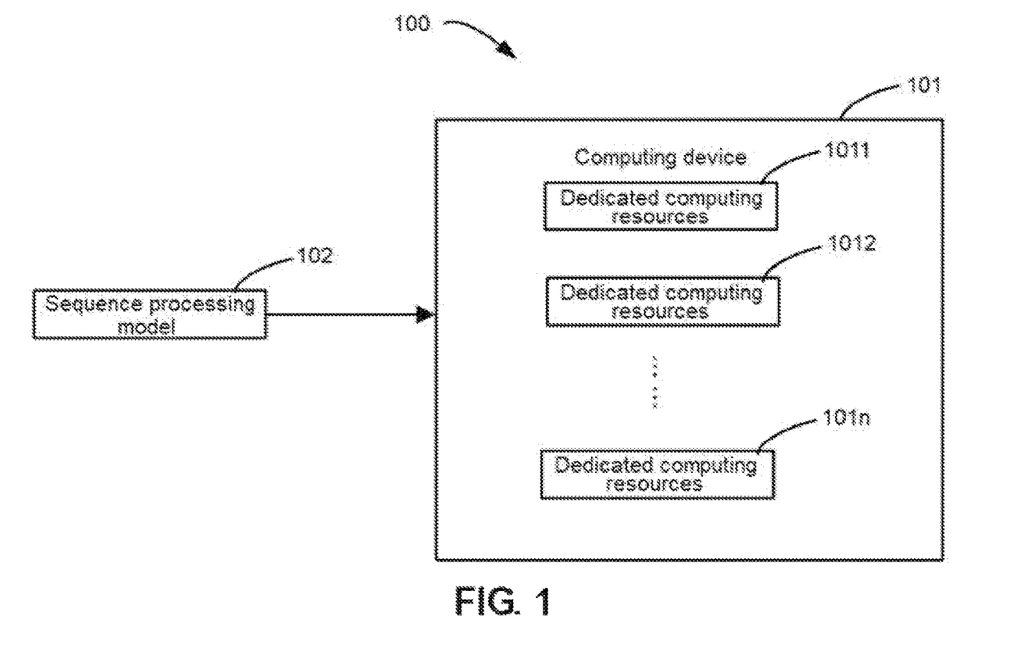
FIG. 1 is a schematic diagram of an example environment in which embodiments of the present disclosure can be implemented.

FIG. 1 is a schematic diagram of example environment 100 in which embodiments of the present disclosure can be implemented. Example environment 100 includes computing device 101, and computing device 101 has dedicated computing resources 1011 to 101n.

Computing device 101 is capable of training sequence processing model 102. Example computing device 101 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any one or more of the above systems or devices, and the like. The server may be a cloud server and also referred to as a cloud computing server or a cloud host, and it is a host product in a cloud computing service system to solve the defects of difficult management and weak business expansibility in the conventional physical host and Virtual Private Server ("VPS" for short) services. The server may also be a server of a distributed system or a server combined with a block chain. A dedicated computing resource herein may be a graphics processing unit (GPU), a tensor processing unit (TPU), or a computing resource capable of performing any data processing, such as a central processing unit (CPU) or another accelerator.

Sequence processing model 102 uses a transformer model as a main framework of the algorithm and can be applied to data processing fields such as NLP, image processing, and text classification. A data processing task based on a multi-head attention mechanism is involved in the transformer model. Sequence processing model 102 herein may be a BERT model, a GPT model, or any other sequence processing model involving a transformer model, or variants of these sequence processing models.

The training of sequence processing model 102 employs distributed data processing across the plurality of dedicated computing resources 1011 to 101n, and the distributed data processing method does not require extensive modifications to additional infrastructures, software stacks, and end-user programs.

Example embodiments for distributed data processing in the present disclosure will be described in more detail below with reference to the accompanying drawings.

Figure 2:
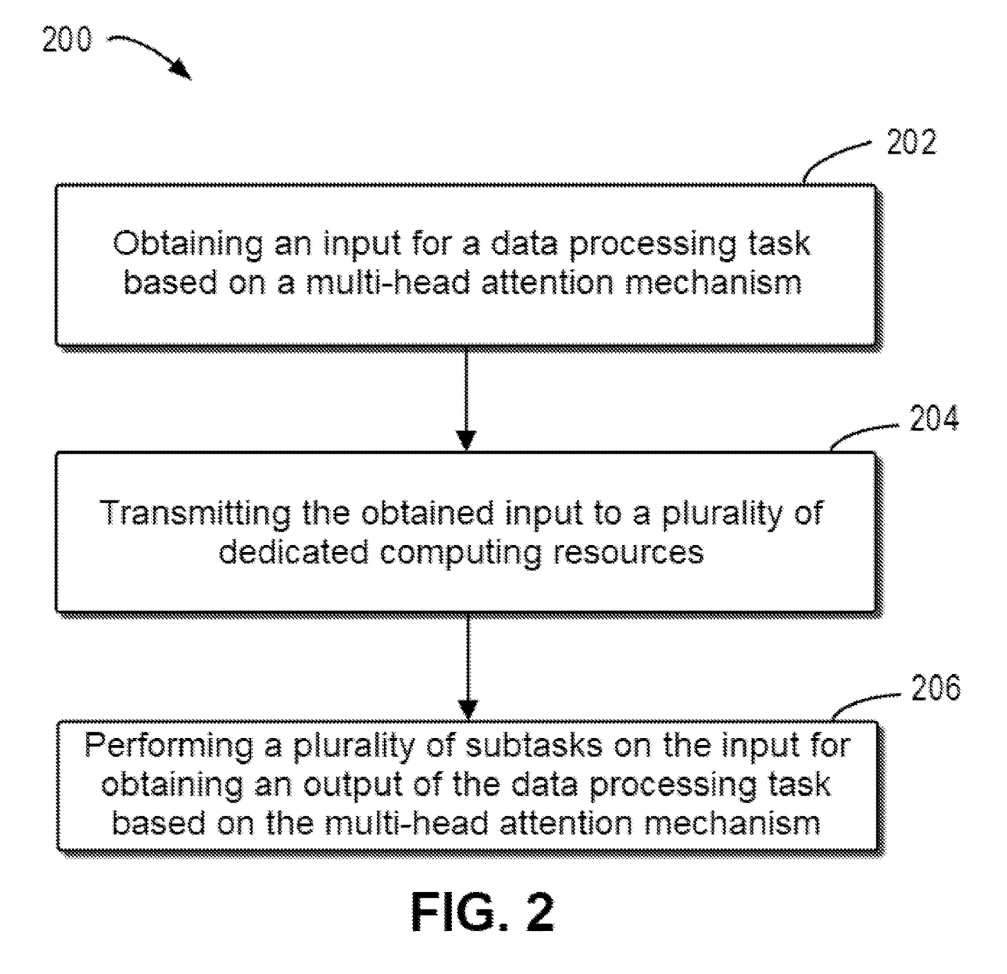
FIG. 2 is a flow chart of a method for distributed data processing according to some embodiments of the present disclosure.

First referring to FIG. 2, a method 200 is shown for distributed data processing according to some embodiments of the present disclosure. The method 200 may be applicable to training sequence processing model 102 by computing device 101. The method 200 will be described below with additional reference to FIG. 3.

At block 202, an input for a data processing task based on a multi-head attention mechanism is obtained. The data processing task (for example, data processing task 301 shown in FIG. 3) includes a plurality of subtasks (for example, a plurality of subtasks 3011 to 3018 shown in FIG. 3). Each subtask of the plurality of subtasks is a data processing process corresponding to one attention head in the multi-head attention mechanism. For example, subtask 3011 corresponds to attention head 3021 in a plurality of attention heads 3021 to 3028, and subtask 3012 corresponds to attention head 3022 in the plurality of attention heads 3021 to 3028.

At block 204, the input obtained at block 202 is transmitted to a plurality of dedicated computing resources (for example, dedicated computing resources 1011 to 1018). The plurality of subtasks 3011 to 3018 can be distributed in dedicated computing resources 1011 to 1018 for parallel processing. For example, dedicated computing resource 1011 corresponds to subtask 3011, and dedicated computing resource 1012 corresponds to subtask 3012. It should be understood that the correspondence between dedicated computing resource 1011 and subtask 3011 means that the data processing process of subtask 3011 is completed in dedicated computing resource 1011 and does not exist in other dedicated computing resources than dedicated computing resource 1011. The correspondence between dedicated computing resource 1011 and subtask 3011 is similar to the correspondence between dedicated computing resource 1018 and subtask 3018, and will not be repeated here.

At block 206, subtasks 3011 to 3018 are performed on the input for obtaining an output of the data processing task based on the multi-head attention mechanism. For example, subtask 3011 is performed in dedicated computing resource 1011 to obtain an output for subtask 3011, subtask 3012 is performed in dedicated computing resource 1012 to obtain an output for subtask 3012, and subtask 3018 is performed in dedicated computing resource 1018 to obtain an output for subtask 3018. Based on the output of subtask 3011, the output for subtask 3012, and the output for subtask 3018, an output for data processing task 301 is obtained.

With the above method, the sequence processing model training process eliminates the need for a large computing resource and reduces the training time, and the process does not require extensive modifications to infrastructures, deep learning frameworks, and end-user deep learning programs, thus reducing the difficulty in model training.

In some embodiments, the input at block 202 may be an input after transforming the primitives via embedding and position encoding layers, or may be an output of a data processing task mentioned at block 206 by another data processing task. Transmission of the input may have a size of a 512-byte vector.

In some embodiments, the type of the dedicated computing resource may be determined according to a subtask performed on the dedicated computing resource. For example, a BERT model may need a 64G GPU for training, a multi-head attention mechanism involved in the BERT model has 8 attention heads, and the 8 attention heads correspond to 8 subtasks; therefore, 8 8G GPUs may be used to train the BERT model. It should be understood that the BERT model requiring a 64G GPU may also use a GPU of another type, for example, 4 16G GPUs, and each 16G GPU may perform operations on 2 subtasks. Of course, the number of subtasks performed on each GPU may vary. However, the use of dedicated computing resources with lower computing capacity and uniform distribution of subtasks are more conducive to reducing the cost and improving the efficiency.

Figure 3:
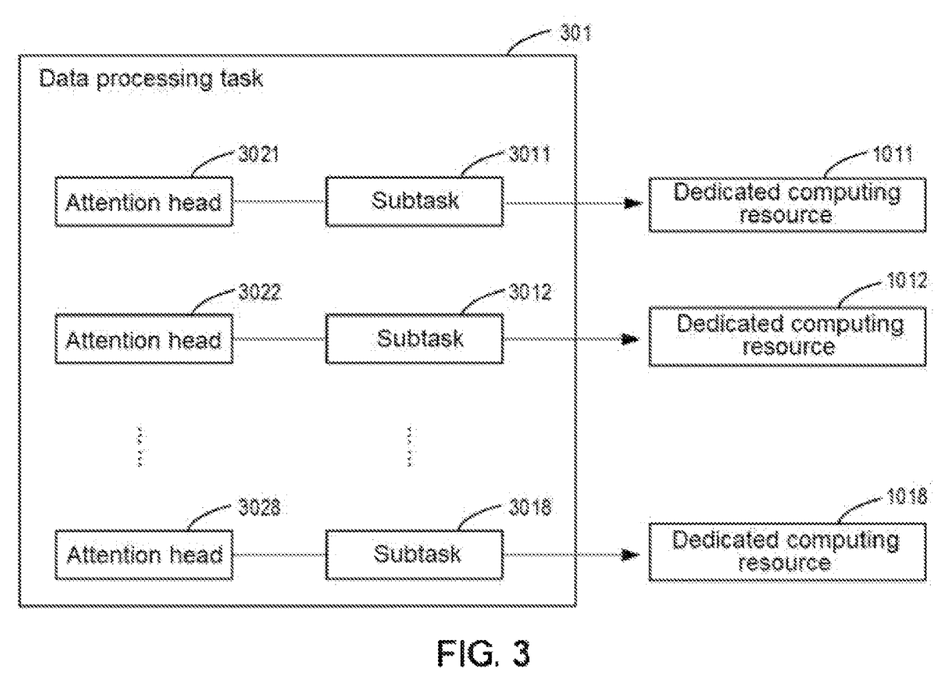
FIG. 3 is a schematic diagram of a method for distributed data processing according to some embodiments of the present disclosure.

In some embodiments, the method described above may also perform adjustments on outputs of the subtasks (for example, subtasks 3011 to 3018 shown in FIG. 3) for optimizing the output of the data processing task (for example, data processing task 301 shown in FIG. 3). The adjustment may be a residual connection layer function, a normalization layer function, or a fully connected network layer function.

In some embodiments, the adjustment may be performed separately in a plurality of dedicated computing resources (for example, dedicated computing resources 1011 to 101n). In some other embodiments, the adjustment may also be collecting the outputs of various subtasks into a dedicated computing resource for centralized processing. In one example, the adjustment on the output of subtask 3011 may be performed in dedicated computing resource 1011. The adjustment on the output of subtask 3012 may be performed in dedicated computing resource 1012. By analogy, the adjustment on the output of subtask 3018 may be performed in dedicated computing resource 1018. The above method may then collect adjustment results for the subtasks (for example, subtasks 3011 to 3018 shown in FIG. 3) from the dedicated computing resources (for example, dedicated computing resources 1011 to 1018). Moreover, the above method may further perform integration processing on the collected adjustment results for the subtasks (for example, subtasks 3011 to 3018 shown in FIG. 3).

For example, the multi-head attention mechanism of the present disclosure in some embodiments may have 8 attention heads. Accordingly, data processing task 301 includes subtasks 3011 to 3018. Subtasks 3011 to 3018 may be distributed among dedicated computing resources 1011 to 1018 for performing. In this way, a data processing task that requires a large dedicated computing resource (for example, a 64G GPU) may be distributed among 8 small dedicated computing resources (for example, 8G GPUs) for performing. For example, subtask 3011 is performed and an adjustment on an output of subtask 3011 is performed in dedicated computing resource 1011, subtask 3012 is performed and an adjustment on an output of subtask 3012 is performed in dedicated computing resource 1012, and by analogy, subtask 3018 is performed and an adjustment on an output of subtask 3018 is performed in dedicated computing resource 1018. Then, an adjustment result for subtask 3011 is collected from dedicated computing resource 1011, an adjustment result for subtask 3012 is collected from dedicated computing resource 1012, and by analogy, an adjustment result for subtask 3018 is collected from dedicated computing resource 1018. An integration of the adjustment results for all subtasks is performed in any one of dedicated computing resources 1011 to 1018.

In some embodiments, the integration may include the following step. The adjustment result for subtask 3011, the adjustment result for subtask 3012, the adjustment result for subtask 3013, the adjustment result for subtask 3014, the adjustment result for subtask 3015, the adjustment result for subtask 3016, the adjustment result for subtask 3017, and the adjustment result for subtask 3018 are integrated together.

In some other embodiments, the integration may include the following steps. First, integration is performed on adjustment result $x_1$ for subtask 3011 and adjustment result $x_2$ for subtask 3012. Further integration is then performed on integration result $S_{1,2}$ and adjustment result $x_3$ for subtask 3013, and the obtained further integration result may be integrated with an adjustment result for another subtask (for example, $x_4$). Through the step-by-step integration method, integration result $S_{1,4}$ for subtasks 3011 to 3014 may be obtained.

Figure 4:
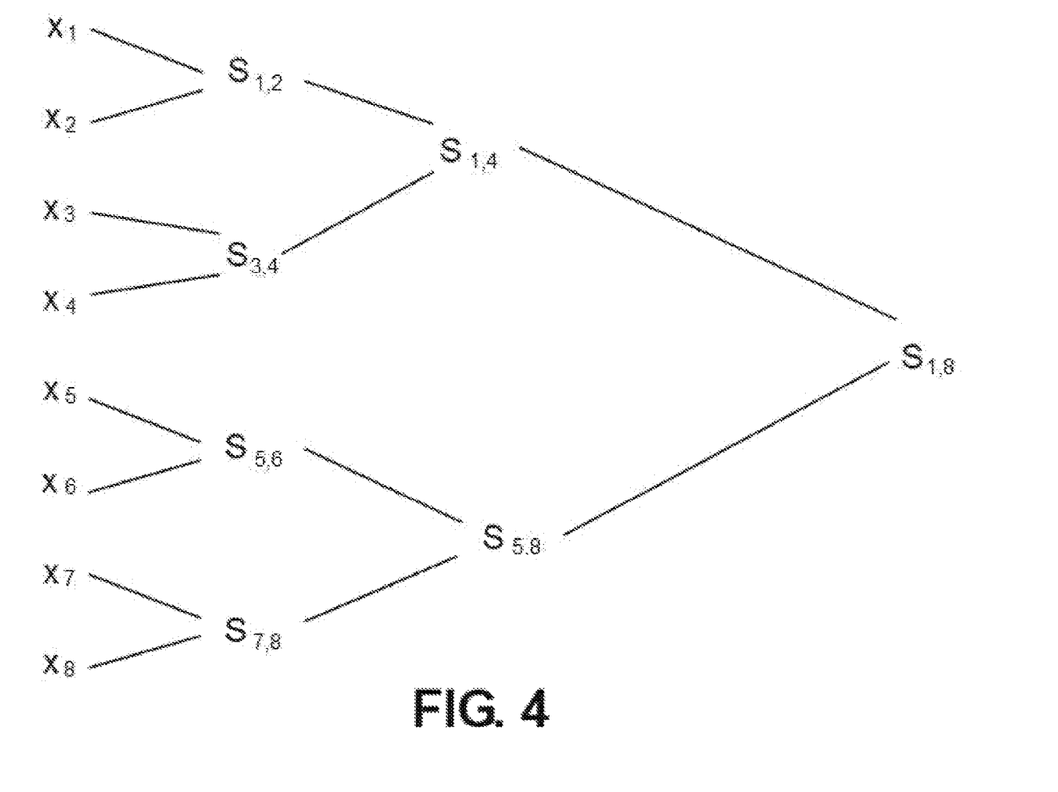
FIG. 4 is a schematic diagram illustrating utilization of a method for distributed data processing according to some embodiments of the present disclosure.

In one or more embodiments, the integration may include the following steps. First, as shown in FIG. 4, integration is performed on adjustment result $x_1$ for subtask 3011 and adjustment result $x_2$ for subtask 3012 to obtain integration result $S_{1,2}$, integration is performed on adjustment result $x_3$ for subtask 3013 and adjustment result $x_4$ for subtask 3014 to obtain integration result $S_{3,4}$, integration is performed on adjustment result $x_5$ for subtask 3015 and adjustment result $x_6$ for subtask 3016 to obtain integration result $S_{5,6}$, and integration is performed on adjustment result $x_7$ for subtask 3017 and adjustment result $x_8$ for subtask 3018 to obtain integration result $S_{7,8}$. Then, integration is performed on integration result $S_{1,2}$ and integration result $S_{3,4}$ to obtain integration result $S_{1,4}$, and integration is performed on integration result $S_{5,6}$ and integration result $S_{7,8}$ to obtain integration result $S_{5,8}$. Further, integration is performed on integration result $S_{1,4}$ and integration result $S_{5,8}$ to obtain integration result $S_{1,8}$. Through the step-by-step integration method, integration result $S_{1,8}$ for subtasks 3011 to 3018 may be obtained. The method shown in FIG. 4 can be implemented with a small number of network layers, so it is more conducive to improving the training efficiency of a model.

It should be understood that the present disclosure may adopt any one of the above integration methods, and may also adopt a combination of the above integration methods. FIG. 4 is an example diagram for illustration only.

For example, regarding a normalization operation, since the mean calculation is a linear calculation, a total mean may be calculated according to the following Equation (1), and a standard deviation may be calculated in a pairwise parallel manner as shown in FIG. 4:

$$\mu = \sum_{i=1}^{H} \frac{\mu_i}{H}, \text{ where } \mu_i = \sum_{i=1}^{512} x_i \quad \text{Equation (1)}$$

where $\mu$ is the total mean, H is the number of attention heads in the multi-head attention mechanism, $\mu_i$ is a mean for the ith attention head, and $x_i$ is a standard deviation for the ith data set.

The amount of data transfer involved in the present disclosure is small, and therefore, inefficiencies caused by the transfer of data between different computing devices is greatly reduced. In the solution of the present disclosure, parameters (query, key, and value) of an attention mechanism are all used by a local computing resource only, and there is no need to move parameters across computing resource pairs. The solution of the present disclosure has no requirements for a framework and has no convergence impact on a training process. In view of the fact that computations for various attention heads are separated in the multi-head attention mechanism of the transformer model, the present disclosure may easily realize parallel computation.

In the implementation of training with gradient descent, a task based on a single-head attention mechanism only depends on parameters needed to perform operations in the corresponding local computing resource, and therefore, it is only required to broadcast an error to each dedicated computation resource, and transfer the error to a certain dedicated computing resource for centralized processing in the next operational step. The data transfer involved in this implementation is similar to that involved in the method described above, but may have a different propagation direction.

Figure 5:
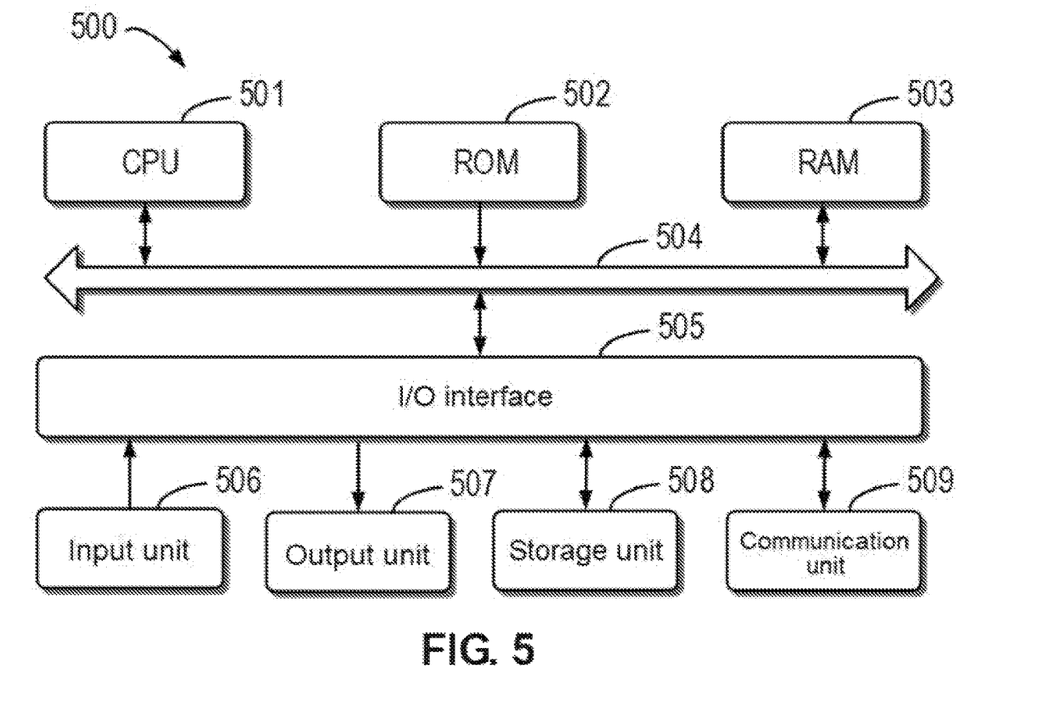
FIG. 5 is a block diagram of an example device that can be used to implement an embodiment of the present disclosure.

FIG. 5 is a schematic block diagram of example device 500 that can be used to implement an embodiment of the present disclosure. For example, device 500 may be used for implementing method 200 of FIG. 2.

As shown in FIG. 5, device 500 includes central processing unit (CPU) 501 which may perform various appropriate operations and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by CPU 501. For example, in some embodiments, method 200 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded to RAM 503 and executed by CPU 501, one or more operations of method 200 described above may be executed.

Embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions can be provided to a processing unit of a general-purpose computer, a special-purpose computer, or other programmable data processing apparatuses to produce a machine, such that when these instructions are executed by the processing unit of a computer or other programmable data processing apparatuses, an apparatus that implements the functions/operations specified in one or more blocks in the flow charts and/or block diagrams is generated. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/operations specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/operations specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or operations, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for distributed data processing, comprising:
obtaining an input for a data processing task based on a multi-head attention mechanism, the data processing task comprising a first subtask and a second subtask, the first subtask corresponding to a first attention head in the multi-head attention mechanism, the first attention head being implemented using a first dedicated computing resource, and the second subtask corresponding to a second attention head in the multi-head attention mechanism, the second attention head being implemented using a second dedicated computing resource different than the first dedicated computing resource, wherein the first subtask and the second subtask are exclusively associated with the respective first attention head and second attention head implemented by the respective first dedicated computing resource and second dedicated computing resource, and wherein there is a one-to-one correspondence between the first attention head and the first dedicated computing resource and a one-to-one correspondence between the second attention head and the second dedicated computing resource;
transmitting the input to the first dedicated computing resource and the second dedicated computing resource, for performance of the respective first subtask and second subtask utilizing the respective first attention head and second attention head, the first dedicated computing resource corresponding to the first subtask, and the second dedicated computing resource corresponding to the second subtask; and
performing the first subtask and the second subtask on the input, utilizing the respective first attention head implemented by the first dedicated computing resource and the second attention head implemented by the second dedicated computing resource, for obtaining an output of the data processing task.

2. The method according to claim 1, further comprising:
performing adjustment on an output of the first subtask and an output of the second subtask for optimizing the output of the data processing task.

3. The method according to claim 2, wherein the adjustment is performed in the first dedicated computing resource and the second dedicated computing resource.

4. The method according to claim 3, further comprising:
collecting an adjustment result for the first subtask from the first dedicated computing resource;
collecting an adjustment result for the second subtask from the second dedicated computing resource; and
performing integration on the adjustment result for the first subtask and the adjustment result for the second subtask.

5. The method according to claim 4, wherein the data processing task further comprises a third subtask, the third subtask corresponds to a third attention head in the multi-head attention mechanism, the third subtask and an adjustment on an output of the third subtask are performed in a third dedicated computing resource, and the method further comprises:
collecting an adjustment result for the third subtask from the third dedicated computing resource; and
performing the integration on the adjustment result for the first subtask, the adjustment result for the second subtask, and the adjustment result for the third subtask.

6. The method according to claim 4, wherein the data processing task further comprises a third subtask, the third subtask corresponds to a third attention head in the multi-head attention mechanism, the third subtask and an adjustment on an output of the third subtask are performed in a third dedicated computing resource, and the method further comprises:
collecting an adjustment result for the third subtask from the third dedicated computing resource;
performing the integration on the adjustment result for the first subtask and the adjustment result for the second subtask to obtain a first integration result; and
performing the integration on the first integration result and the adjustment result for the third subtask.

7. The method according to claim 3, wherein the data processing task further comprises a third subtask and a fourth subtask, the third subtask corresponds to a third attention head in the multi-head attention mechanism, the third subtask and an adjustment on an output of the third subtask are performed in a third dedicated computing resource, the fourth subtask corresponds to a fourth attention head in the multi-head attention mechanism, the fourth subtask and an adjustment on an output of the fourth subtask are performed in a fourth dedicated computing resource, and the method further comprises:
collecting an adjustment result for the third subtask from the third dedicated computing resource;
collecting an adjustment result for the fourth subtask from the fourth dedicated computing resource;
performing integration processing on an adjustment result for the first subtask and an adjustment result for the second subtask to obtain a first integration result;
performing integration processing on the adjustment result for the third subtask and the adjustment result for the fourth subtask to obtain a second integration result; and
performing the integration on the first integration result and the second integration result.

8. The method according to claim 1, wherein a type of each dedicated computing resource is determined according to a subtask performed on the dedicated computing resource.

9. The method according to claim 1, wherein the first subtask comprises a plurality of first subtasks, the second subtask comprises a plurality of second subtasks, and the number of first subtasks in the plurality of first subtasks is equal to the number of second subtasks in the plurality of second subtasks.

10. An electronic device, comprising:
at least one processor; and
at least one memory storing computer-executable instructions, wherein the computer-executable instructions, when executed by the at least one processor, cause the electronic device to perform operations actions comprising:
obtaining an input for a data processing task based on a multi-head attention mechanism, the data processing task comprising a first subtask and a second subtask, the first subtask corresponding to a first attention head in the multi-head attention mechanism, the first attention head being implemented using a first dedicated computing resource, and the second subtask corresponding to a second attention head in the multi-head attention mechanism, the second attention head being implemented using a second dedicated computing resource different than the first dedicated computing resource, wherein the first subtask and the second subtask are exclusively associated with the respective first attention head and second attention head implemented by the respective first dedicated computing resource and second dedicated computing resource, and wherein there is a one-to-one correspondence between the first attention head and the first dedicated computing resource and a one-to-one correspondence between the second attention head and the second dedicated computing resource;

transmitting the input to the first dedicated computing resource and the second dedicated computing resource, for performance of the respective first subtask and second subtask utilizing the respective first attention head and second attention head, the first dedicated computing resource corresponding to the first subtask, and the second dedicated computing resource corresponding to the second subtask; and performing the first subtask and the second subtask on the input, utilizing the respective first attention head implemented by the first dedicated computing resource and the second attention head implemented by the second dedicated computing resource, for obtaining an output of the data processing task.

11. The electronic device according to claim 10, wherein the actions further comprise:

performing adjustment on an output of the first subtask and an output of the second subtask for optimizing the output of the data processing task.

12. The electronic device according to claim 11, wherein the adjustment is performed in the first dedicated computing resource and the second dedicated computing resource.

13. The electronic device according to claim 12, wherein the actions further comprise:

collecting an adjustment result for the first subtask from the first dedicated computing resource;

collecting an adjustment result for the second subtask from the second dedicated computing resource; and performing integration on the adjustment result for the first subtask and the adjustment result for the second subtask.

14. The electronic device according to claim 13, wherein the data processing task further comprises a third subtask corresponding to a third attention head in the multi-head attention mechanism, the third subtask and an adjustment on an output of the third subtask are performed in a third dedicated computing resource, and the actions further comprise:

collecting an adjustment result for the third subtask from the third dedicated computing resource; and performing the integration on the adjustment result for the first subtask, the adjustment result for the second subtask, and the adjustment result for the third subtask.

15. The electronic device according to claim 13, wherein the data processing task further comprises a third subtask corresponding to a third attention head in the multi-head attention mechanism, the third subtask and an adjustment on an output of the third subtask are performed in a third dedicated computing resource, and the actions further comprise:

collecting an adjustment result for the third subtask from the third dedicated computing resource;

performing the integration on the adjustment result for the first subtask and the adjustment result for the second subtask to obtain a first integration result; and performing the integration on the first integration result and the adjustment result for the third subtask.

16. The electronic device according to claim 12, wherein the data processing task further comprises a third subtask and a fourth subtask, the third subtask corresponds to a third attention head in the multi-head attention mechanism, the third subtask and an adjustment on an output of the third subtask are performed in a third dedicated computing resource, the fourth subtask corresponds to a fourth attention head in the multi-head attention mechanism, the fourth subtask and an adjustment on an output of the fourth subtask are performed in a fourth dedicated computing resource, and the actions further comprise:

collecting an adjustment result for the third subtask from the third dedicated computing resource;

collecting an adjustment result for the fourth subtask from the fourth dedicated computing resource;

performing integration processing on an adjustment result for the first subtask and an adjustment result for the second subtask to obtain a first integration result;

performing integration processing on the adjustment result for the third subtask and the adjustment result for the fourth subtask to obtain a second integration result; and performing the integration on the first integration result and the second integration result.

17. The electronic device according to claim 10, wherein a type of each dedicated computing resource is determined according to a subtask performed on the dedicated computing resource.

18. The electronic device according to claim 10, wherein the first subtask comprises a plurality of first subtasks, the second subtask comprises a plurality of second subtasks, and the number of first subtasks in the plurality of first subtasks is equal to the number of second subtasks in the plurality of second subtasks.

19. A computer program product tangibly stored on a non-transitory computer-readable medium and comprising machine-executable instructions, wherein the machine-executable instructions, when executed by a machine, cause the machine to perform a actions comprising:

obtaining an input for a data processing task based on a multi-head attention mechanism, the data processing task comprising a first subtask and a second subtask, the first subtask corresponding to a first attention head in the multi-head attention mechanism, the first attention head being implemented using a first dedicated computing resource, and the second subtask corresponding to a second attention head in the multi-head attention mechanism, the second attention head being implemented using a second dedicated computing resource different than the first dedicated computing resource, wherein the first subtask and the second subtask are exclusively associated with the respective first attention head and second attention head implemented by the respective first dedicated computing resource and second dedicated computing resource, and wherein there is a one-to-one correspondence between the first attention head and the first dedicated computing resource and a one-to-one correspondence between the second attention head and the second dedicated computing resource;

transmitting the input to the first dedicated computing resource and the second dedicated computing resource, for performance of the respective first subtask and second subtask utilizing the respective first attention head and second attention head, the first dedicated computing resource corresponding to the first subtask, and the second dedicated computing resource corresponding to the second subtask; and performing the first subtask and the second subtask on the input, utilizing the respective first attention head implemented by the first dedicated computing resource and the second attention head implemented by the second dedicated computing resource, for obtaining an output of the data processing task.

20. The computer program product according to claim 19, wherein the actions further comprise:

performing adjustment on an output of the first subtask and an output of the second subtask for optimizing the output of the data processing task.

\* \* \* \* \*